July 4, 1967 H. F. GREEN 3,328,941
AIR TREATING AND CONDITIONING APPARATUS
Original Filed July 24, 1963 7 Sheets-Sheet 1

INVENTOR.
HAROLD F. GREEN
BY
*Johns Leonards*
*his* ATTORNEY.

INVENTOR.
HAROLD F. GREEN

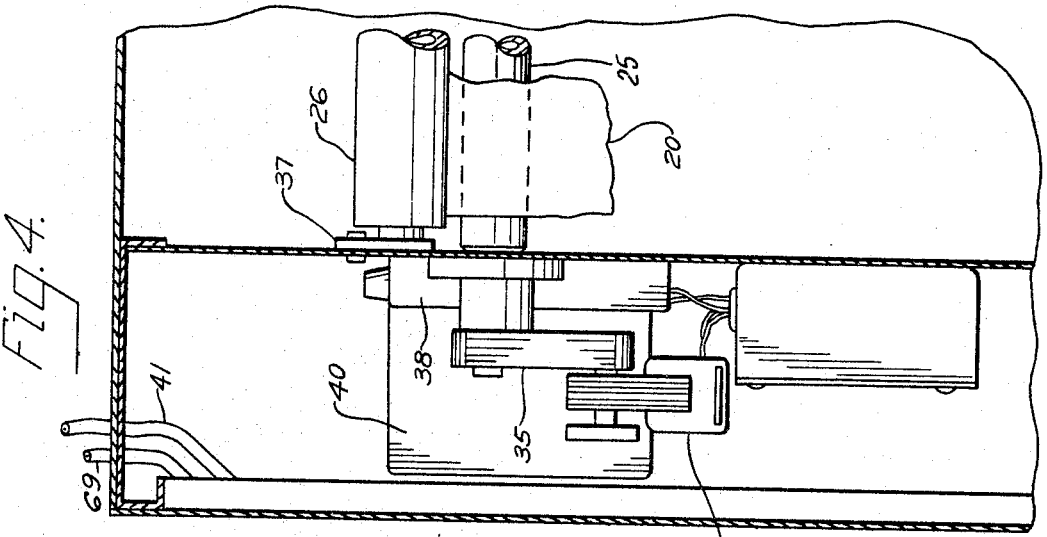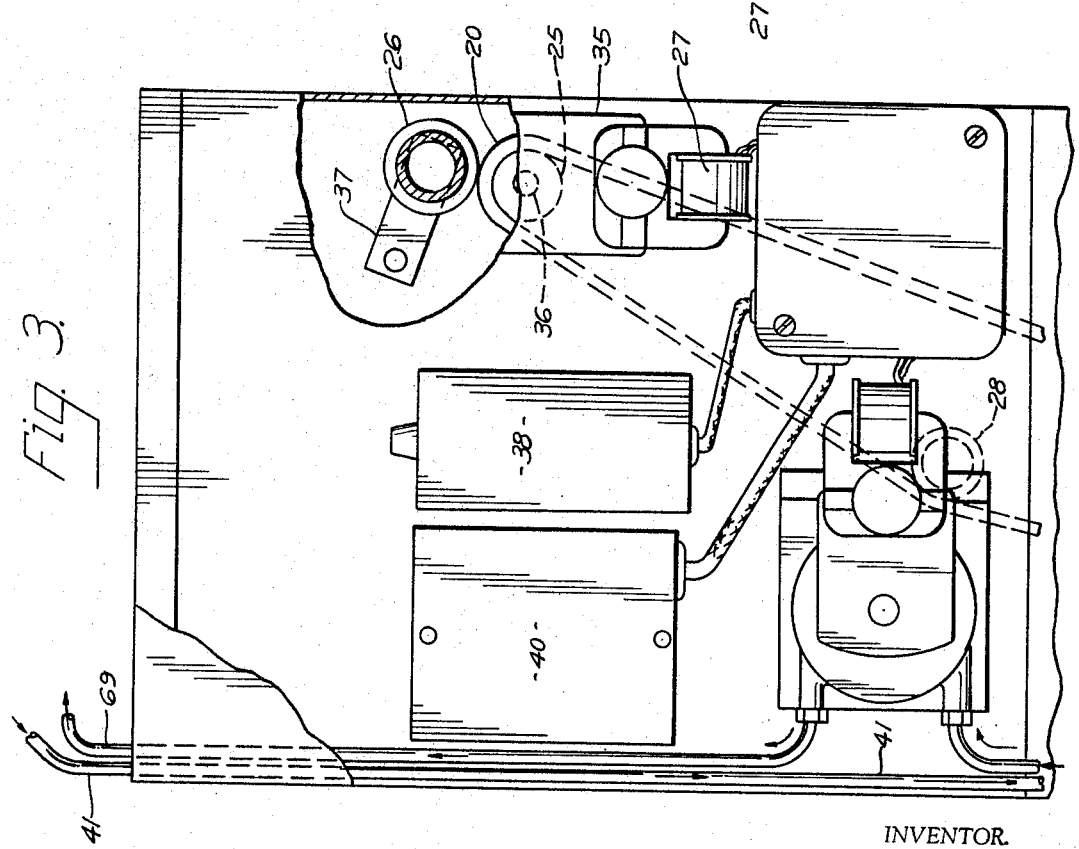

INVENTOR.
HAROLD F. GREEN
BY
ATTORNEY.

INVENTOR.
HAROLD F. GREEN

July 4, 1967            H. F. GREEN            3,328,941

AIR TREATING AND CONDITIONING APPARATUS

Original Filed July 24, 1963            7 Sheets-Sheet 6

INVENTOR.
HAROLD F. GREEN
BY
ATTORNEY.

INVENTOR.
HAROLD F. GREEN

United States Patent Office 3,328,941
Patented July 4, 1967

3,328,941
AIR TREATING AND CONDITIONING
APPARATUS
Harold F. Green, Rocky River, Ohio, assignor, by mesne assignments, to Space Conditioning, Inc., Harrisonburg, Va., a corporation of Maryland
Continuation of application Ser. No. 297,335, July 24, 1963. This application June 30, 1966, Ser. No. 562,001
10 Claims. (Cl. 55—234)

This application is a continuation of my copending application, Ser. No. 297,335, filed July 24, 1963, titled "Air Treating and Conditioning Apparatus," and now abandoned which application was a continuation-in-part of application Ser. No. 111,966, filed May 23, 1961, titled "Method and Apparatus for Air Treatment," and now abandoned.

This invention relates to an apparatus for treating air preparatory to its discharge into an occupied space, and particularly to an apparatus for performing individually, or in selected combinations with each other, any one or more of the operations of cleaning, deodorizing, cooling, humidifying, and dehumidifying, the air.

One of the principal objects of the present invention is to provide an air cleaning apparatus in which a new and improved air filter is driven repeatedly about a predetermined closed path, and, during its passage along the path, each portion is caused to pass first through a bath of water or selected solution wherein it is washed by combined action of the bath and mechanical manipulation of the portion, then through a drain zone in which the water or solution is drained out to a degree such that only superficial films thereof remain on the portion, and then through a nair cleaning zone in which a stream of air to be cleaned is blown through the filter and thereby cleaned by the filter and films, and, if desired, otherwise treated by the films, depending on the composition of the particular bath.

Another object is to control the apparatus automatically so that it can operate efficiently for prolonged periods without requiring servicing or the attention of an operator.

Specific objects are to provide simple and efficient devices for controlling the manner and speed of travel of the filter along its path, for maintaining the bath level and the proportions of the bath ingredients within desirable ranges, and for removing from the bath the foreign matter which, having been removed from the air, is introduced into the bath by the filter.

A more specific object is to provide a new and improved bath which not only facilitates cleaning of the air, but also prolongs the life and improves the quality and functioning of the filter.

Various other objects and advantages of the invention will become apparent from the following description wherein reference is made to the drawings, in which:

FIG. 3 is an enlarged fragmentary left side elevation of the upper portion of the apparatus illustrated in FIG. 2; part of the cabinet wall being broken away for clearness in illustration;

FIG. 4 is an enlarged fragmentary front elevation of the structure illustrated in FIG. 3, part of the cabinet wall being broken away;

Figure 1:
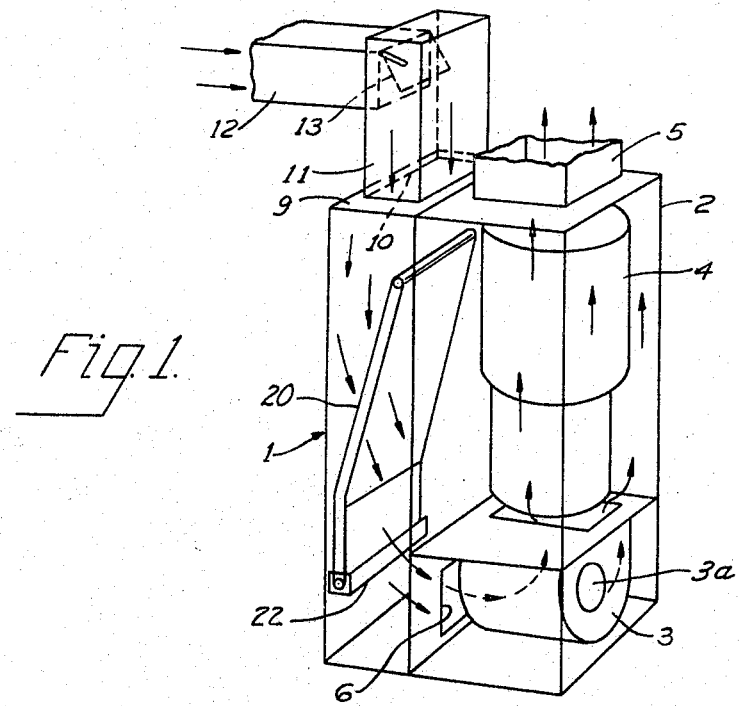
FIG. 1 is a diagrammatic perspective view of an air treating apparatus embodying the principles of the present invention, combined with a household heating furnace so as to employ the furnace air blower and duct system for circulating the air for cleaning and distribution.

Referring first to FIG. 1, the form of the apparatus shown for purposes of illustration is enclosed in a cabinet 1 which is disposed alongside the air jacket 2 of a domestic hot air furnace so as to take advantage of the existing recirculating motor driven blower 3, driven by an electric motor 3a, and distribution duct system of the furnace for circulation of air through the present apparatus and distribution thereof to selected locations in the house. If desired, the apparatus may be equipped with its own blower and distribution system, or may be arranged to discharge directly into the space in which it is located, and operated independently of the furnace, if desired.

The furnace shown is a conventional one employing a heat exchanger 4 over which air is blown by the blower 3. The air is discharged from the jacket 2 through a suitable outlet 5 into a conventional plenum chamber from which distribution ducts lead to the various rooms to be heated. The rear wall of the air jacket 2 has an air inlet 6 through which air can be drawn into the inlet of the blower 3.

The cabinet 1 has a front wall 7 with an outlet 8 near the bottom. The cabinet 1 is disposed with its front wall 7 juxtaposed against the rear wall of the jacket 2 with the inlet 6 of the jacket 2 connected with the outlet 8 of the cabinet 1.

The cabinet 1 has a top wall 9 in which is an air inlet 10 which communicates with an inlet duct 11 for reception of air from the rooms for recirculation. An outside by-pass duct 12 is also in communication with the duct 11 so that the outside air can be drawn into the inlet 10. A damper 13 is provided for controlling the flow from the ducts 11 and 12 so that all of the air to be treated can be recirculated room air, or all can be drawn in from the outside through the duct 12, as when cooling by evaporation is desired, or part can be outside air and part recirculated air.

The cabinet 1 has a partition wall 14 which extends forwardly and rearwardly and divides the interior of the cabinet 1 into two compartments one of which, designated 15, is connected to the outlet 8 and inlet 10 and contains the filter mechanism. The other compartment, designated 16, contains the controls and power drives for the filter and treating system.

Mounted within the compartment 15 is a filter 20 which is so arranged that substantially all of the air entering the inlet 10 must pass through the filter in order to reach the outlet 8. The filter is one which is driven along a closed, generally upright path. Along the lower portion of the path the filter passes through a suitable bath of water, or of a solution, wherein it is washed. At it rises above the path, part of the bath water, or solution, drains out leaving superficial films of the water or solution on the filter. Along a succeeding portion of its path the filter, with these films thereon, is subjected to the air stream passing through the cabinet 1, after which it returns to the bath for cleaning, followed by a repetition of the cycle.

For this purpose, the filter 20 preferably is an elongated sheet of the material which, at its ends, is provided with complementary zipper fastening means 21 by which the ends are connected together to provide an endless belt but which can be unfastened to facilitate installation and removal. This belt is substantially coextensive, edgewise of the belt, with the compartment 15 and extends from near the top thereof to the lower portion.

An open top tank 22 is arranged in the compartment 15 just above the outlet 8.

In order to support and drive the filter for movement along a closed path wherein it passes into and out of the tank and across the air stream during its travel along a closed path, the filter 20 is mounted on a driving roll 25 against which it is held for frictional driving by means of an idler roll 26. The roll 25 is driven by a suitable electric motor 27.

The filter passes over suitable guide rolls 28, 29, 30 and 31 and beneath a roll 32, these rolls holding and guiding it in proper position relative to the air stream.

The motor 27 is drivingly connected to the drive roll 25 through a reduction gear train 35 which is directly connected to the shaft 36 of the roll 25. The idler roll 26 is supported on suitable pivoted links 37 so that it can impose its own weight on the filter portion passing over the roll 25. The motor 27 may be controlled in the first instance by a humidistat 38 which can be set for the humidity desired or completely turned off. Openings are provided connecting the compartments 15 and 16 at both their upper and lower portions. Consequently, due to inbalance air pressures in the compartment 15, air will flow upwardly or downwardly in the compartment 16. The humidistat is preferably disposed between the upper and lower openings so that it will be quickly responsive to the relative humidity of the air which is treated. If intermittent drive is desired, the motor may also be made responsive to an intermitter control 40, as will later be described.

At its lower portion, where it passes beneath the roll 32, the filter is immersed in a liquid bath in the tank 22. As its lower portion enters the bath, the bath water or solution floods and washes the filter, dislodging much of the foreign matter therefrom. As the flooded portion passes beneath the roll 32, and while immersed, the immersed portion is first squeezed so as to distort and compress it in the direction of its thickness and discharge the water or solution. As it issues from beneath the roll 32 it is released so as to draw in a fresh supply of the water or solution from the bath preparatory to the thus cleaned portion issuing from the bath.

The roll 32, therefore, provides a suitable compressing and releasing means for manipulating the filter in this manner.

In the illustrative example, the roll 32 is free floating and preferably is weighted so that its weight, of itself, is enough to compress and distort the belt in a direction of its thickness to at least half of its normal thickness as it passes beneath the roll 32. Thus the flooding, squeezing, release and re-expansion all occur while the portion of the belt being cleaned is below the surface of the bath. As the portion thus treated rises from the bath, the water or solution drains very rapidly downwardly from the filter, further flushing and cleaning it. As the portion continues to rise, in a very short space and time of movement, the residue of the bath water or solution remaining thereon is substantially only superficial films coating strands of the filter.

The filter 20 is composed of a sheet of readily compressible, resilient and self-restoring, synthetic organic, foamed material of which the thin septums or cell walls have been removed or eaten away chemically so that the final filter is a very open and porous three-dimensional skeletal framework of integrally interconnected strands which are readily distortable elastically and immediately self-restoring. The filter has substantial thickness so that the strands can buckle and flex and the cells defined thereby can be readily changed in shape and distorted so as to squeeze out all of the bath solution except for superficial films coating the strands. This material, for brevity, as hereinafter referred to as "skeletonized material." It has about 20 to 40 pores per lineal inch, and preferably about thirty (30) pores per lineal inch, in each of its three dimensions. The preferred material is composed of urethane, but other plastics having sufficient resiliency and ready compressibility may be employed.

The preferred material is one marketed as Scott Industrial Foam by Scott Paper Company of Chester, Pa.

This material has distinct advantages over other materials heretofore known. Due to its open structure, the uniformity of the pores, and the tensile strength of the strands, it retains its shape and assures a relatively free flow of air. Hence, as it enters the bath, the liquid of the bath penetrates fully and almost instantly, and hence can assist in dislodging particles of foreign matter in the filter. All surfaces of the strands are readily accessible to the bath and can be flushed thereby. The filter is readily distortable by the pressure of the roll 32 to expel the bath water or solution. Its almost instantaneous self-restoration, when relieved of the roll pressure, permits the inflow and full penetration of fresh water or solution from the bath.

Furthermore, due to the high degree of openness and porosity, and the absence of closed cells which could entrap liquid it drains very rapidly. This drainage reduces the weight to which the filter is subjected to such an extent that the filter is not elongated endwise or distorted and contracted edgewise, as would be the case were all walls intact so that myriad drops of water or solution were entrapped. Likewise, due to this effective drainage and openness of structure, the filter offers very low resistance to the flow of air and it is not objectionably bellied out and distorted at the portion currently subjected, in the direction of its thickness, to the air stream.

Figure 7:
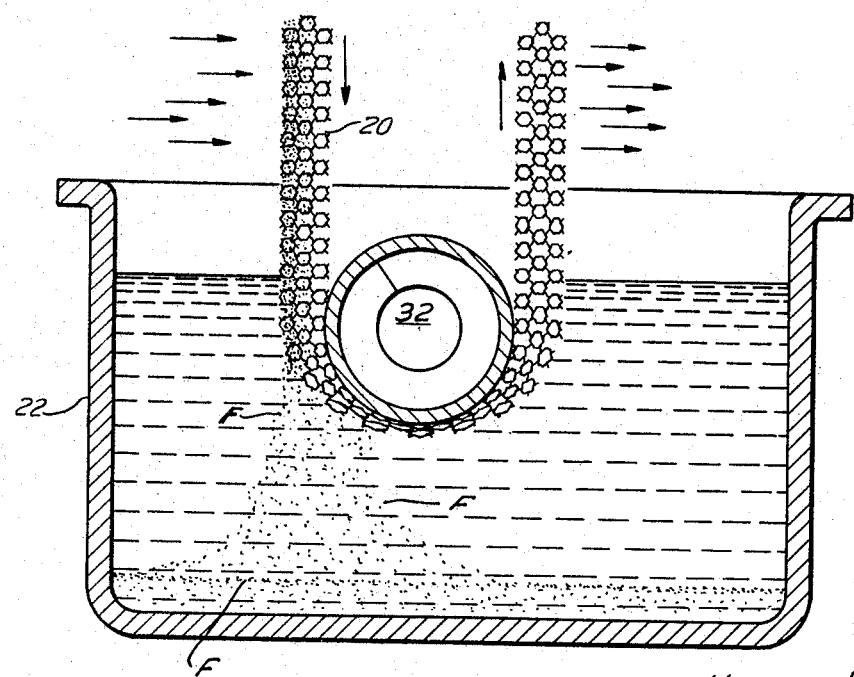
FIG. 7 is an enlarged fragmentary side elevation of the apparatus showing the lower portion of the filter immersed in a cleaning bath, and a means for manipulating the filter for cleaning it as it passes through the bath.
Figure 2:
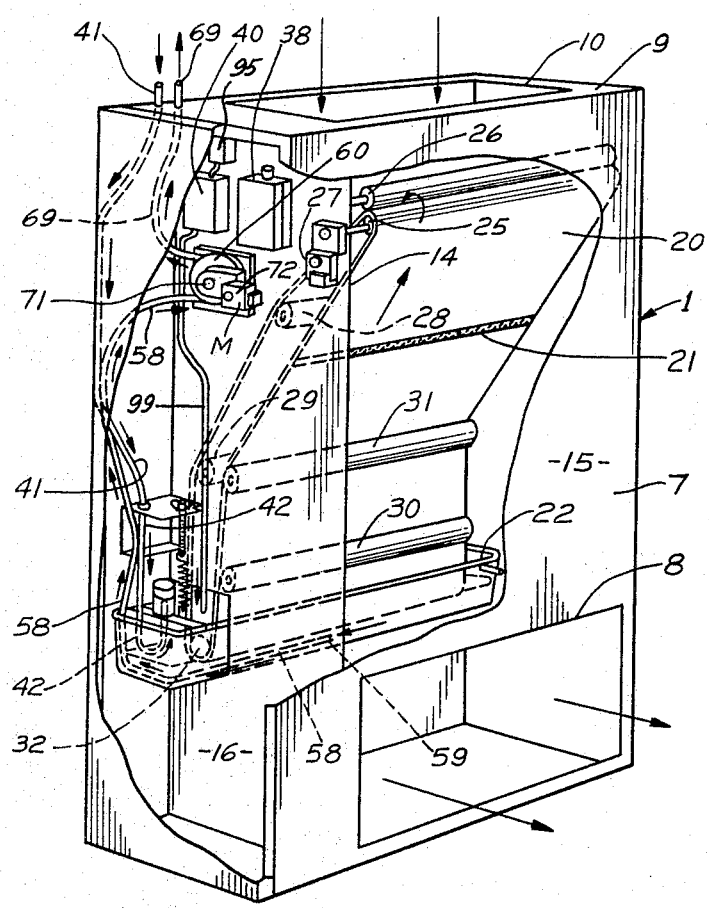
FIG. 2 is an enlarged perspective view of the treating unit of FIG. 1, parts of the enclosing cabinet being broken away for clearness in illustration.

As mentioned, the filter 20 moves along a closed path. It must be open to receive the bath when it enters the bath. Next it must be compressed in the direction of its thickness so as to distort its entire cross section and expel the liquid as it passes beneath the roll 32. Finally it must be permitted to re-expand so that fresh liquid can flow therethrough as it issues from beneath the roll 32. This is illustrated in FIG. 7. Due to the very open nature of the skeletonized foamed material, this compression and distortion of the material can be effected by the roll 32 alone, as therein illustrated, though additional supplemental rolls can be provided for this purpose if desired, the specific means for compression and release being secondary to the fact that compression is initiated and completed and re-expansion occurs all while the filter is immersed in the bath.

The filter in the form of an endless belt, as described, is preferred also because it provides a better means for entrapping foreign particles from the air stream passed therethrough. In effect, it filters the air twice during each passage of the air through the cabinet 1. For example, the down-traveling portion of the belt, to the left in FIG. 7, first intercepts the air stream and removes some of the foreign matter suspended in the air. The air in passing through the upwardly rising portion, to the right in FIG. 7, is further cleaned, at even higher efficiency.

The superficial films remaining on the strands of the filter at the downward travelling portion of the filter are adequate to assure the pick-up of particles from the air. The particles on this portion do not have to remain adherent to the filter for long as they soon reach the bath where they are wetted and flushed out.

Due to the openness of the filter and the ready accessibility of the water or solution in the bath to the surfaces of all of the strands, foreign particles collected on the filter, indicated generally by the dots F, are flushed out and settle to the bottom of the tank 22, as illustrated.

If desired, when the endless belt filter driven by the rolls is employed, it is sometimes desirable to coat each edge of the filter, and the margins of the front and rear faces of the filter adjacent thereto with a film latex or like resilient sealing material. The coating film may be sprayed on and is continuous, at each edge, from the inner limit of the front margin, around the edge to the inner limit of the rear margin. This reinforces and strengthens the filter, thus assuring that it is not stretched to an objectional degree vertically under the weight of the roll 32 and moisture burden and does not bend and spill air from the stream too rapidly over the edges, but, instead, assists in localizing any bellying of the belt to its central portion so that the air passes therethrough. As a result, less moisture is carried against the side walls of the casing at the ends of the filter. Furthermore, the coating films so reduce, or eliminate, the porosity of the edges that the escape of water through the edges onto the cabinet is greatly reduced. The coating at each edge is about two inches wide on the forward face, and about one-half inch wide on the rear face. The edge itself is limited to the thickness of the belt which may be from about one-tenth of an inch, as shown in FIG. 7, to one-half inch.

In addition, nylon traction tapes about an inch wide and coated with resilient plastic may be bonded on the filter near the edges, and preferably on the rear face, for reducing wear on the filter due to the friction drive, for reinforcing the belt against bellying, and for maintaining dimensional stability lengthwise of the filter.

With the structure thus far described, the bath used may be replenished from time to time by removal of the tank 22, and cleaning, refilling and replacing it.

If the present apparatus is to be made so as to be capable of performing a number of different selected air treating operations, means are provided for controlling the travel of the filter accurately to meet the various conditions required.

Likewise, the bath in the reservoir may be plain water or a special aqueous solution or other chemical bath, depending on the selected treating operations desired. In almost all instances, plain water or an aqueous solution is used. In either event, a certain amount of the water is lost from the tank 22 during operation and has to be replaced. If the water is to be replaced automatically, a suitable inlet pipe 41 is provided and is connected to a suitable water source. The inlet pipe 41 is connected, in turn, to a water level control which is in the form of a suitable U-shaped inlet tube 42 supported in fixed position relative to the cabinet 1. The tube has a discharge end 43 open upwardly. The tank 22 is rockably supported at one end on a suitable fixed support and, at the other end, is connected to a hanger 44. The hanger 44 is suspended from the lower end of a tension spring 45. The upper end of the spring 45 is connected to a bolt 46 passing through a bracket 47 which is secured in fixed relation to the cabinet 1. A wing nut 48 is provided on the bolt 46 for manipulating the tension on the spring so that it normally supports the tank in horizontal position when the tank is full, and lifts the connected end of the tank as the bath is reduced.

Mounted on the bracket 44 for movement therewith, and thereby with the adjacent end of the tank 22, in a closure plug 49. When the tank is filled to the proper level, it lowers sufficiently under the weight of the bath to cause the plug 49 to engage and close the upper discharge end 43 of the tube 42 and thereby stop the flow of water. When the bath is subsequently reduced in volume, the spring 45 lifts the adjacent end of the tank 22 and with it the plug 49, thereby admitting water through the discharge end 43 of the tube 42. The regulation is such that the level of the bath in the tank 22 is kept a desired distance above the center of the roll 32 so that the portion of the filter currently in the bath can be squeezed or contracted and relieved and reexpanded to normal condition while it is fully immersed in the bath.

A suitable roll retainer arm 50 may be connected to the bracket 47 and engage the roll 32 for preventing the displacement of the roll 32 axially.

Figure 6:
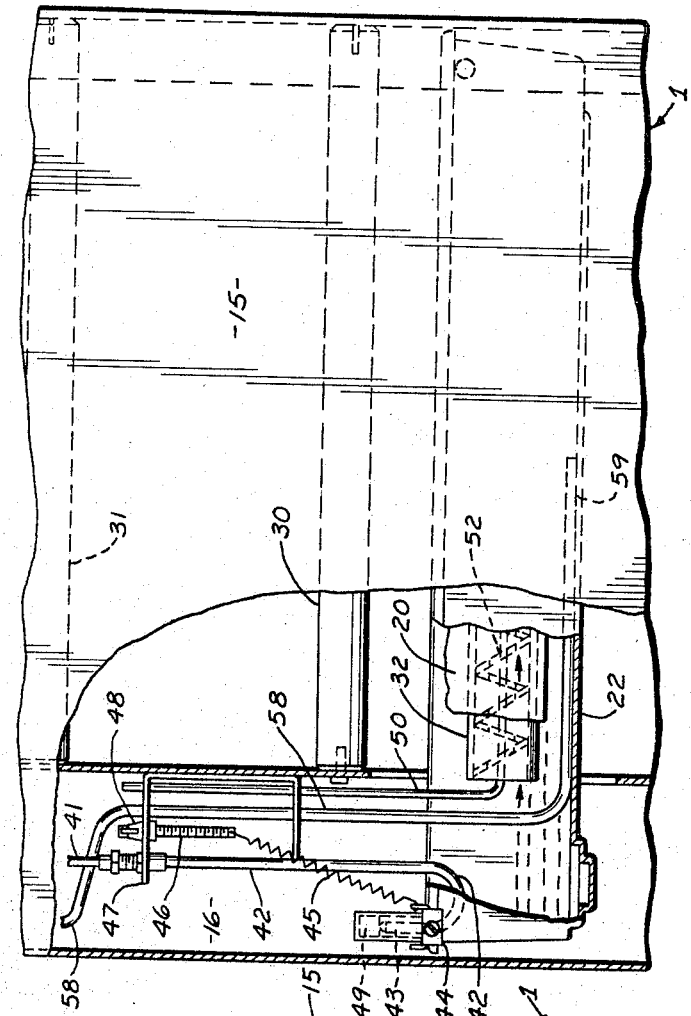
FIG. 6 is a fragmentary front elevation of the apparatus illustrated in FIG. 5.
Figure 5:
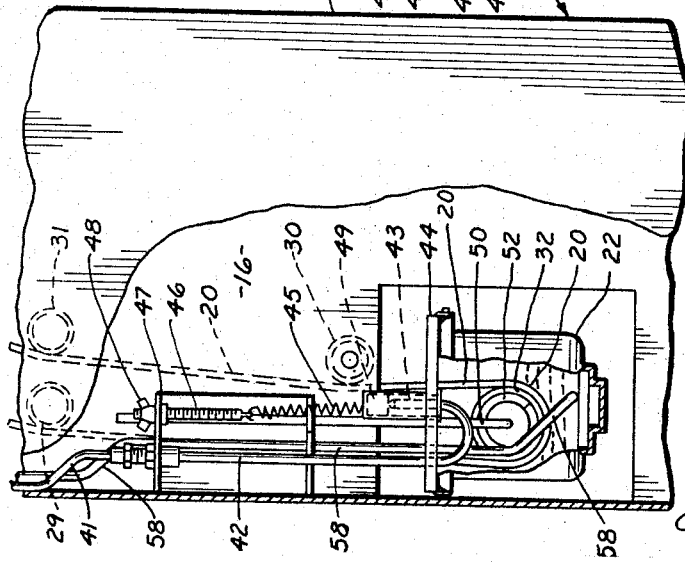
FIG. 5 is an enlarged fragmentary left side elevation of the lower portion of the apparatus illustrated in FIG. 2, part of the cabinet wall being broken away for clearness in illustration.
Figure 8:
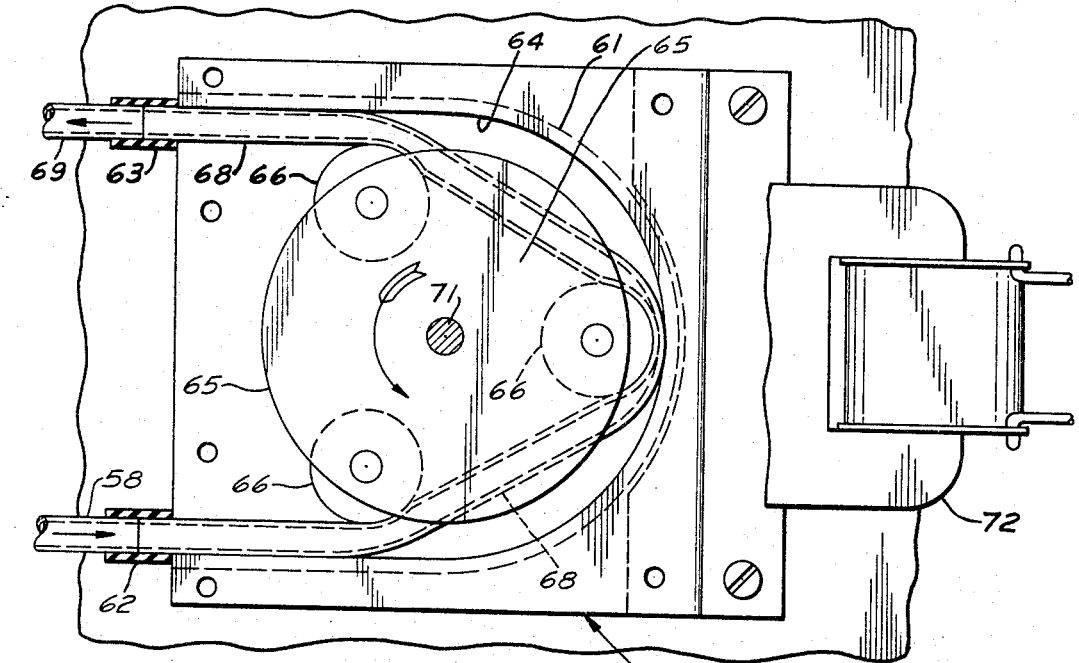
FIG. 8 is a front elevation of a motor driven sludge pump forming part of the present invention.
Figure 9:
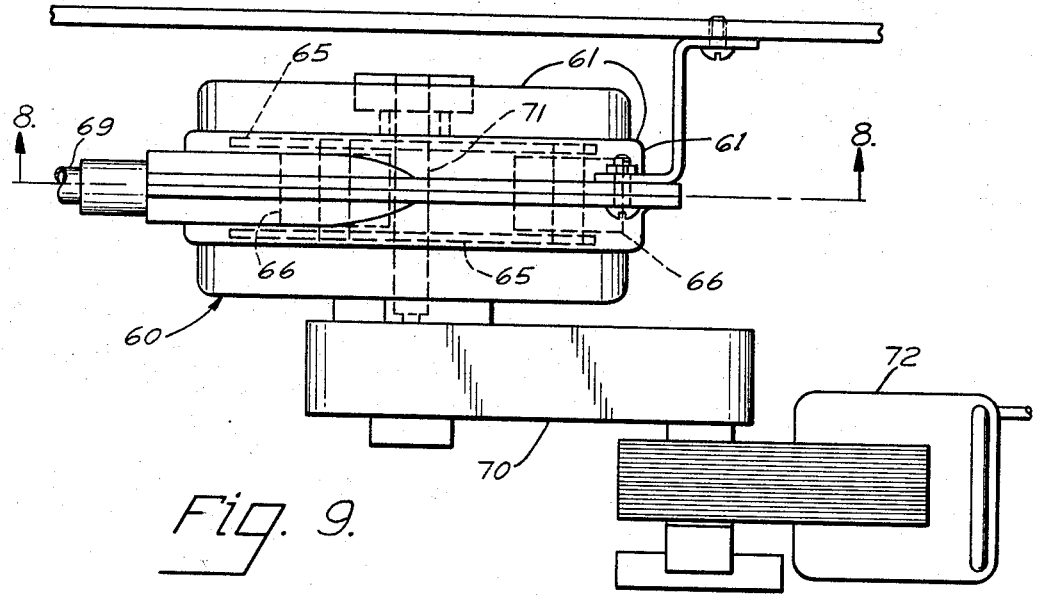
FIG. 9 is a top plan view of the pump illustrated in FIG. 8.
Figure 10:
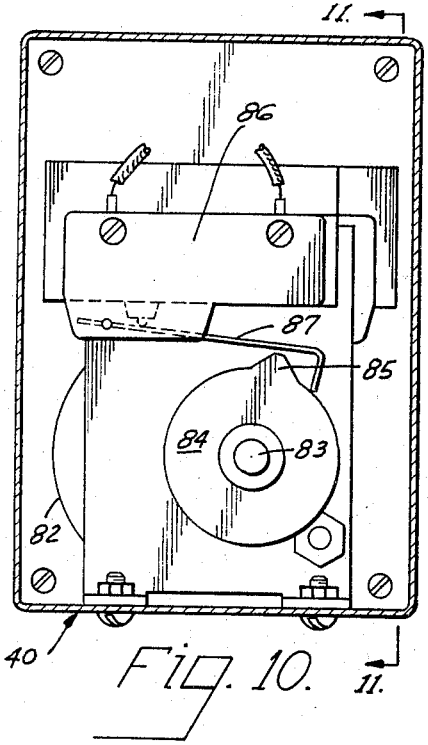
FIG. 10 is an enlarged fragmentary left end elevation of the apparatus showing an intermittent timing device which is employed in automatic control of the apparatus, the cover of the device being omitted.

If desired, as illustrated in FIG. 6, the roll 32 may be hollow and open at both ends, and may be provided internally with an Archimedes screw 52 extending about its inner periphery from one end to the other. The screw is such as to cause a gradual migration of the water or solution in the roll unidirectionally from one end of the roll 32 to the other as the roll 32 rotates.

With the level of the bath maintained in this manner, it is desirable to remove the foreign material from the reservoir automatically. For this purpose, a drain tube 58 is provided. The drain tube 58 has at one end an inlet 59 disposed in the bottom of the tank 22, preferably at the end of the tank adjacent to the end in which the discharge 43 of the inlet tube is disposed. This is desirable because foreign matter and sludge will be urged to migrate toward the inlet 59 by the Archimedes screw in the roll 32.

In general, the foreign matter removed from the filter in the bath tends to settle to the bottom of the tank 22 and form a conglomerate slurry or sludge. This sludge accumulates very slowly and presents a removal problem because a sufficient flow of water or solution out of the reservoir for transporting the sludge away would be impractical and wasteful. In order to remove such sludge without at the same time removing a disproportionate quantity of the bath, a motor driven pump 60 is employed.

The pump 60 is of a specialized type and comprises a hollow casing 61 having an inlet 62, an outlet 63, and an inner peripheral wall 64. The wall 64 preferably is cylindrical. Rotatably mounted within the casing 61 for rotation about an axis concentric with the wall 64 is a rotor 65 on which are mounted a plurality of compression rollers 66. In the form illustrated, three rollers 66 are provided and are 120° apart about the rotational axis of the rotor 65. Extending into the inlet 62 into the exterior of the body 61, through the body, and out of the outlet 63, is a resilient self-restoring pumping tube 68. The tube 68 is connected at its inlet end to the drain tube 58 and at its outlet end to a discharge tube 69 leading to a suitable sump or drain. The tube 68 passes about the assemblage of rollers 66 in the interior of the casing 64. The peripheries of the rollers are spaced relative to the inner peripheral wall 64 a distance such that the tube, of the wall thickness and diameter employed, is compressed and completely closed at the locations currently passing between each roller 66 and the peripheral wall 64, and is released so that it restores itself to fully open condition at the portions currently between adjacent rollers and at the inlet and outlet. The rotor 65 is driven through a suitable speed reducer 70, connected to the shaft 71 of the rotor 65, by an electric motor 72.

As a result of this compression and self-restoration, the pump is a positive displacement, pulsating, intermittent pump providing a systolic-diastolic action. Consequently, the sludge in the tube 68, between any two adjacent rollers 66, is entrapped and forced therealong from the inlet to the outlet and through the discharge tube 69 by a peristaltic action, and cannot return to the reservoir 22.

This type of pump has another distinct advantage. With it, the volume of water or solution pumped from the tank 22 can be controlled with great precision. Consequently, if any additives are to be added to the bath in minute ratios to the volume of the bath, the exact amount to be added can readily be predetermined and the additives fed to the bath in accurately balanced ratios.

Furthermore, a pump of this character, that operates intermittently with pulsations, stirs the material in the drain tube 58 and the discharge tube 69 so as to prevent clogging of the tubes. Should any particles of substantial size or any flake be entrapped in the sludge, it can readily be transferred and positively forced by the sludge through the pump and discharge tube, or broken up in the pump so that it can flow readily with the sludge.

Preferably the tubes 58, 68 and 69 are of a resilient synthetic organic plastic having a naturally greasy surface to which foreign matter cannot readily adhere.

The pump has a further advantage in that materials in the pump, when the pump is stopped for a period, cannot obtain sufficient air for appreciable evaporation which might tend to make them harden and clog the pump.

The simplest embodiment of the invention is one wherein the bath in the tank 22 is water and is replenished by manually adding water to the tank, the tank being removed periodically, and cleaned, refilled, and replaced. The blower 3 of the furnace may be turned on manually and run continuously for the cleaning periods desired. If cleaning only is desired, the damper 13 may be set for recirculation of air in the building.

If cooling by evaporation of the water is also desired, the damper 13 is set to admit air through the outside air duct 12 only. The air drawn in from the outside and passed through the filter continuously is cleaned by the filter, but also cooled due to evaporation of the water on the filter. This, of course, necessitates that a certain amount of moisture from the tank 22 be picked up by the outside air so that the air discharged by the blower 3 is humidified. However, there is not a continual accumulation and increase in relative humidity in the air inside of the building, as would be the case were the air recirculated under such conditions. Throughout many areas of the country, the relative humidity is so low that the amount of moisture added to the air by this operation is not such as to cause any inconvenience.

If less evaporation and cooling are desired, as when part or all of the air in the space is to be recirculated by opening the duct 11 and closing the duct 12 in whole or part, the filter may be operated intermittently. This is true also in other instances, as when it is desirable to stress the cleaning of air without humidification, or while heating in which case continuous admission of outside air in large quantities would be unduly expensive.

Figure 11:
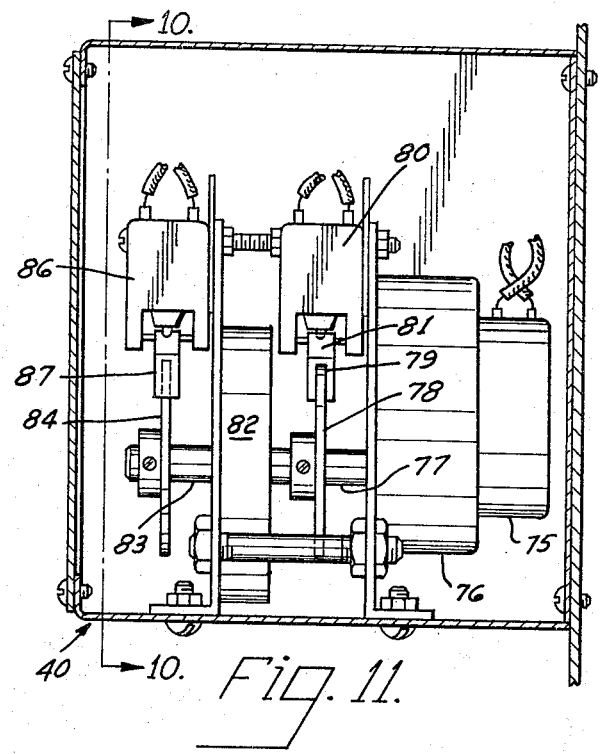
FIG. 11 is a view of the apparatus of FIG. 10 as viewed on line 11—11 in FIG. 10.
Figure 12:
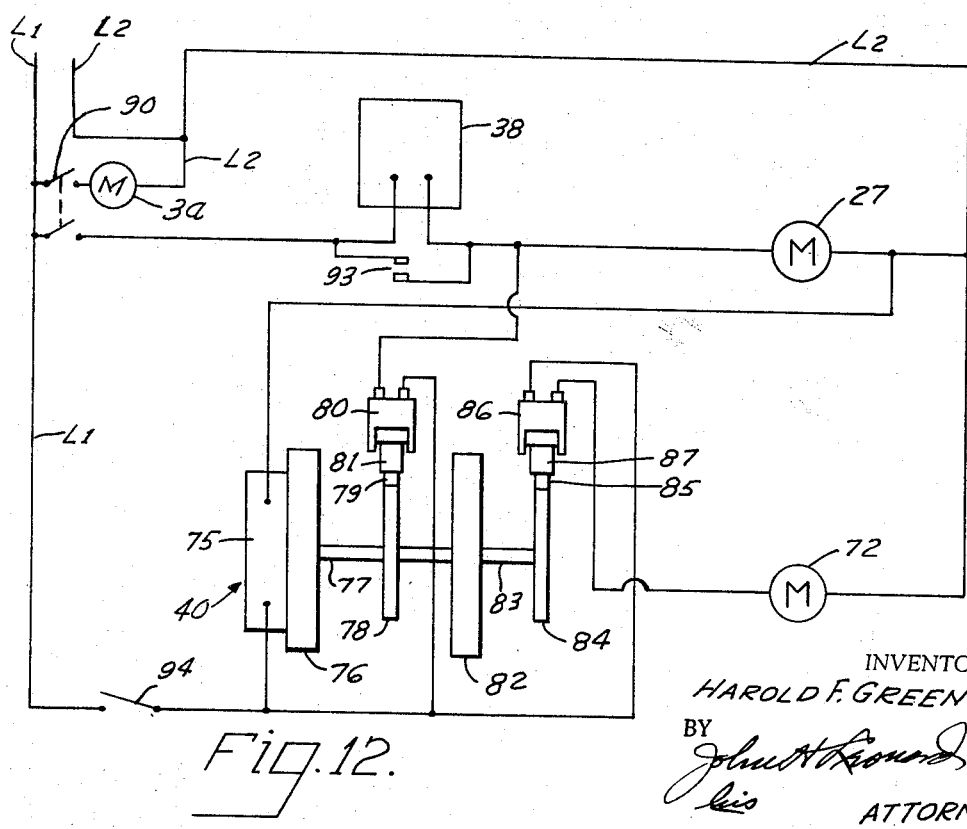
FIG. 12 is a wiring diagram showing the electrical connections which are employed when it is desired to operate the treating apparatus automatically.

In all instances of use, it is desirable that the filter 20 be driven very slowly, and preferably intermittently, and the pump 60, if used, be operated intermittently. For this purpose, the intermitter 40, heretofore referred to, is provided. As best illustrated in FIG. 11 and 12, the intermitter 40 comprises a continuously driven electric motor 75 of the electric clock type which, in turn, drives a speed reducer 76. The speed reducer drives a suitable output shaft 77 on which is mounted a cam disc 78 having an operating finger 79. A normally Off switch 80, for controlling the filter drive motor 27, is provided. The switch 80 has an operating lever 81 with which the finger 79 cooperates for turning the switch On. The output shaft 77 drives a speed reducer 82 which, in turn, drives an output shaft 83. Mounted on, and for co-rotation with, the shaft 83 is a cam disc 84 having an operating finger 85. A normally Off switch 86 having an operating lever 87 which is arranged to be operated by the finger 85 is provided for controlling the pump motor 72.

The clock motor 75 and speed reducer 76 are such that the output shaft 77 is normally driven at about one revolution per minute. The cam 78 is such that the On-time of the switch 80 is from two to four seconds per minute. The speed reducer 82 is such that it reduces the speed of the cam 84 to about one revolution per hour, and the cam 84 is such that the switch 86 is held On approximately two minutes per hour.

As best illustrated in FIG. 12, the motor 3a of the furnace blower is connected across a 110 volt A.C. source not shown, through one contact of a suitable manual switch 90, by leads $L_1$ and $L_2$, so that, if desired, it can be kept On continuously for periods during which cooling is required. It may additionally be connected by a conventional thermostat, not shown, when the furnace is used for heating.

The humidistat 38 is connected in a circuit in series with the filter drive motor 27 and another contact of the manual switch 90. This circuit is connected in parallel with the motor 3a across the leads $L_1$ and $L_2$. This places the filter motor 27 under the control of the humidistat while the blower 3 is operating. If the blower is shut off, the motor 27 no longer operates. If desired, the humidistat 38 may include a by-pass circuit including a normally open switch 93 which, when the humidistat is turned off, may be closed so that the motor 27 can operate independently of the humidistat. Thus, if desired, the filter 20 may be driven continuously so long as the blower 3 is operating. On the other hand, the clock motor 75 of the intermitter 40 is connected across the lines $L_1$ and $L_2$ through a suitable manual switch 94, so that they are operative independently of the humidistat.

The switch 80 is operative when closed to connect the filter drive motor 27 across the lines $L_1$ and $L_2$ in by-passing relation to the humidistat 38 so that the filter can be driven intermittently when the humidistat is Off.

The switch 86 is operative when closed to connect the pump motor 72 across the source $L_1$ and $L_2$ so that the pump can be driven intermittently independently of the humidistat. This arrangement has additional advantages when special solutions are employed for the bath in the tank 22, as the delivery of the pump can be controlled very precisely, so that the exact amount of replacement material to be added to the bath can readily be determined. For example, the pump, driven by an 0.4 ampere motor, can discharge from 0.01 cc. to 100 cc. per pulsation and preferably, when operated intermittently, 2 to 10 cc. per operation.

A particularly desirable solution is an aqueous hygroscopic solution and one containing, by weight, from about 5% to 7% glycerine is preferred. This percentage may be varied, depending on local conditions—for example, from a minimum of 0.5% to 12% concentration.

With such a solution and intermittent drive, as the filter rises out of the bath, most of the solution drains back into the bath, futher cleaning and rinsing the filter beneath the drainage zone.

In the portion of the filter above the drainage zone, before it enters the air stream, the skeletal strands are coated with superficial films of the solution and the pores are open for relatively free passage of air through the filter. As it is rising, the water in the superficial films is being evoparated, and when intermittent slow drive is employed, the fluid may be evaporated to equilibrium by the time the filter enters the air stream. At this time, the superficial films, due to their loss of water, are very viscous and tacky, rather than dilute and highly liquid, as in the tank 22. Hence they more readily entrap any suspended matter in the air, causing the suspended matter to adhere to the belt and the superficial tacky films thereon. Very minute particles are coated and encapsulated with the viscous concentrate. In either event, they lose their airborne capacity and remain on the entrapping portion of the filter until it passes its upper limit of travel, moves down at the opposite side of the rollers where it is again subject to the air and collects further foreign material, and is again washed by the bath. However, as the belt passes again into the bath, and is manipulated by the roll 32, the viscous material is again diluted, becoming less tacky and freeing the accumulated foreign particles into the bath wherein they settle gradually to the bottom of the tank 22 in the form of a sludge. Due to the solution in the bath, this sludge does not become dry and caked, but remains in fluid condition so that it is withdrawn by the pump 60 through the tube 58. When the solution functions in this manner, it does not appreciably affect the humidity. If the filter is driven rapidly, the solution in more dilute form is carried into the air stream and hence humidification and cleaning are combined.

In most cities, the water supply contains dissolved salts, such as calcium and magnesium salts which, if water alone is used, would form scale in the reservoir and on the belt, thus stiffening the filter and tending to clog it in time. While this action is reduced greatly due to the open structure of the present filter, to further improve the operation, chelating agents for the salts in the water are provided. These chelating agents preferably are of the type for inhibiting the formation of scale by calcium and magnesium salts in the water, so that these salts become part of the sludge. However, these particular agents used have an additional advantage in that, having once functioned to inhibit the scale formation by the water-dissolved salts, they remain chelating agents for airborne metallic oxides. Hence as these oxides are entrapped by the belt and brought into the bath, they are removed and become part of the sludge. Due to the glycerine in the bath, the sludge remains soft and fluid enough to be pumped out by the pump 60 and in no case are scale and the like precipitated.

The chelating agent preferably is one sold on the market as Versene 100, which is a trisodium salt of ethylene diamine tetra-acetic acid, marketed by the Dow Chemical Company of Midland, Mich. This salt is preferred because it will complex the salt of almost any metal, whether radio-active or not, to a water soluble complex that can be washed off. Versenex 80, an aqueous solution of pentasodium salt of diethylene triamine penta-acetic acid is very effective, as also is Versanol 120, a trisodium salt of ethylene diamine tetra-acetic acid.

An effective solution is a formulation of 8% Versene 100, 92% glycerine, diluted to an aqueous solution of 5% concentration. About 80 fluid ounces of the aqueous solution fill the tank 22. Usually about 20 cc. per hour are removed by the pump. The loss is made up by the automatic addition of water, as described. About four additional ounces of the undiluted solution is added to the bath each week for replacement. This maintains the concentration of glycerine from about 5% to about 7.2%.

The solution referred to has another distinct advantage, when used as an initial treatment for coating the filter even though the filter is to be used subsequently only with water. It has been found that the coating of the filter with the aqueous solution of glycerine, greatly prolongs the life. This appears to be due to the fact that the solution is hygroscopic and inhibits or prevents drying of the filter and the glycerine lubricates the filter and tends to keep it in soft and resilient condition. The chelating agents tend to neutralize reaction of the alkaline salts in the water with the urethane. When so coated, the filter retains sufficient moisture so that the entrapped material on it does not form hard crusts and deposits.

In order to inhibit the growth of germs, bacteria, fungi, algae, and other odor causing forms, an antiseptic chemical is added to the bath. Preferably, the chemical used is a quaternary ammonium which is desirable in that it is non-volatile, and aids washing, and is composed molecularly of long waxy chains which increase the tensile strength of the urethane fibers of the filter. A desirable one is n-alkyl dimethyl, benzyl ammonium chloride, which, in concentrations of 200 p.p.m. can kill 99.999% of test organisms commonly used for testing the efficacy of such compositions. The bath solution, as mentioned, is concentrated, due to evaporation, before it passes through the forced air stream. Hence the quaternary ammonium salts are concentrated to as much as 600 p.p.m., thus rendering them very effective exactly where subjected to the air stream. This chemical is effective both for deodorizing and sanitizing the air.

Figure 13:
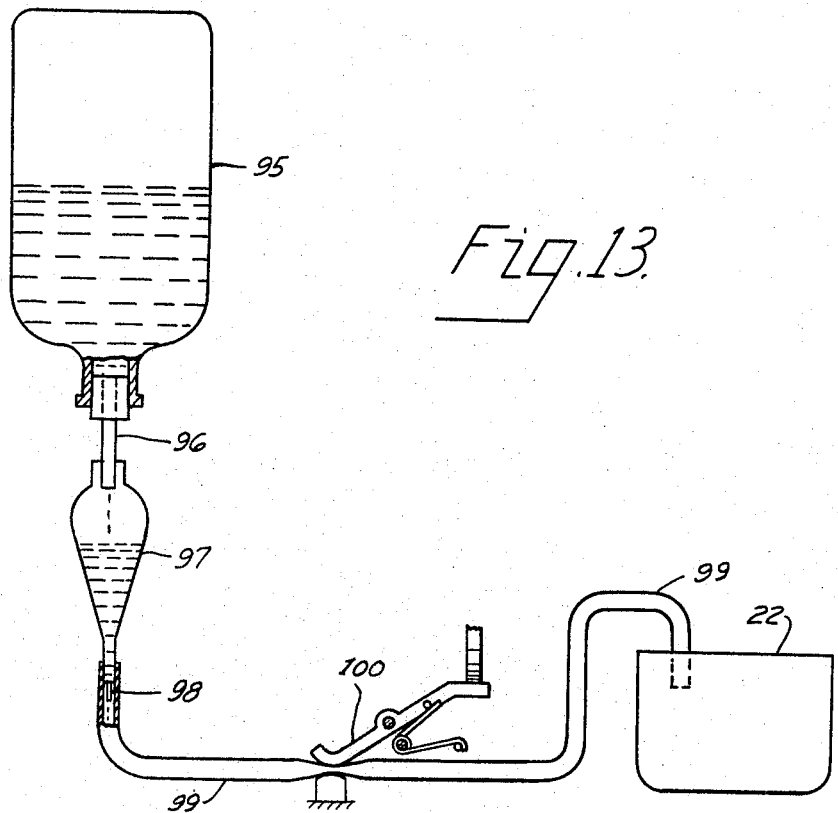
FIG. 13 is an enlarged side elevation of a device for replenishing certain ingredients in one of the solutions that may be used in the bath.

To introduce antiseptic materials automatically, a very simple structure, such as illustrated in FIG. 13, may be provided. Preferably the antiseptic solution is supplied in a disposable bottle 95, having a discharge tube 96, through which the antiseptic is to be discharged. The tube 96 is arranged to drain into the upper end of a reservoir 97. The reservoir 97 fits in sealed relation about the tube 96 and itself discharges through a suitable metering nozzle 98. The nozzle 98 preferably is in the form of a hypodermic needle having an extremely small discharge opening so that the feed of the solution from the reservoir 97 is in the form of successive minute drops. The drops pass into a small tube 99 leading to the tank 22. The tube 99, between its ends, is normally held shut by a spring-pressed finger 100 which is intermittently released for short intervals by the cam which controls the motor of the pulsating pump. With this arrangement, the antiseptic is fed to the tank in direct proportion to discharge by the pump 60. Since this discharge of the pump 60 is very precisely metered, due to the nature of the pump, the amount of antiseptic to be added can be accurately controlled. For instance, the needle can be selected so that 60 droplets are equal to about 1 cubic centimeter. Since the intermitter is such that it operates the pump only once every hour, and then not for more than two minutes, the drip from the nozzle can be controlled so that very few droplets per hour are fed to maintain the proper ratio of antiseptic to tank solution.

Figure 14:
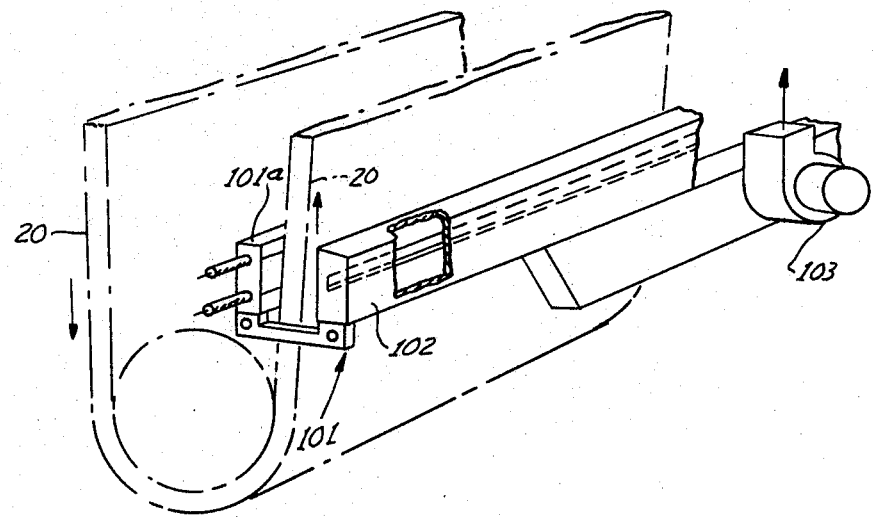
FIG. 14 is an enlarged, fragmentary, perspective view showing the filter combined with a device used for dehumidification.

Again, in some instances, as illustrated in FIG. 14, it may be desirable to dehumidify the air. In those instances, a combined heater and blower unit 101 may be used. The unit includes an infra-red or radiant heater 101a disposed between the up-travelling and down-travelling portions of the filter, and exposed toward the inner face of the up-travelling portion of the filter for heating the solution therein. The unit also includes an elongated duct 102 having an inlet extending across the width of the outer face at the up-travelling portion of the filter. Air is drawn through the filter from the face opposite from the infra-red heater and discharged to the outside atmosphere, by means of a motor driven suction fan 103. With this arrangement, the water in the solution on the filter 20 can be greatly reduced and expelled to the outside of the building, whereupon, when the filter passes through the air stream being recirculated in the building, the hydroscopic material can remove a much greater amount of the moisture from the air.

This operation can be continued until the moisture content of the air is reduced to the desired level.

Preferably the filter material is, as mentioned, urethane, which has specific advantages over synthetic organic plastics, but in some instances, other synthetic organic plastic foam material may be used, but it must be skeletonized for proper operation.

It is apparent, therefore, that with the above described apparatus, a large number of treatments can be administered to the air, selectively, successively, or concurrently, in different combinations, and that apparatus of limited use for performing only one or less than all of the treatments may be provided based on the principles disclosed.

Having thus described my invention, I claim:

1. An apparatus for the treatment of air and comprising an enclosure, upper and lower horizontal rolls therein, at least one of said rolls being a drive roll, means for driving the drive roll unidirectionally at very slow speed, an endless filter belt extending about the rolls and supported thereby and driven by the drive roll along a closed path wherein the inner face of the downwardly traveling portion of the belt is in spaced face to face relation to the inner face of the upwardly traveling portion of the belt, said enclosure having an inlet and an outlet, means to blow air into the inlet, means to direct the air blown into the inlet to enter the belt through the outer face of the belt at the downwardly traveling portion of the belt, then pass through both portions of the belt, and out through the upwardly traveling portion so that the air discharges finally through the outer face of the upwardly traveling portion;

said filter belt being a compressible and distortable, resilient, self-restoring, three dimensional, open porous skeletal framework of interconnected strands of synthetic organic plastic material, and said framework being of substantial thickness so that, upon buckling and flexure of the strands of the framework, the framework is reduced in thickness and the open pores are changed in shape and reduced in size and, upon discontinuance of the buckling and flexure, the framework is self-restored to its original thickness and the pores are self-restored to their original shape;

said open pores providing a multiplicity of relatively free interconnected passages extending through the filter belt and of a size affording a relatively free flow of air directly through the filter belt;

said lower roll being arranged to apply force downwardly against the inner face of the belt, at the lower portion of the belt, sufficient to buckle and flex the strands of the belt and thereby materially reduce gradually the thickness of the belt from the normal thickness it had as it approached the lower roll, and then to gradually release the force as the belt passes out from beneath the lower roll so that the belt restores itself to its normal thickness and the pores restore themselves to their original open shape; and means, including a tank, for maintaining a liquid bath through which the portion of the belt which is in contact with the lower roll is constrained to pass while said portion is in contact with said lower roll.

2. The apparatus according to claim 1 wherein a power driven positive displacement sludge pump is provided and comprises an inlet connected with the tank and an outlet connected to a sump, a resilient tube connecting the inlet to the outlet, and pressure applying means for causing collapse of the tube followed by release thereof in a migratory zone progressing repeated unidirectionally from the inlet toward the outlet to provide a systollic-diastolic pumping action.

3. The apparatus according to claim 2 wherein the pressure applying means comprises a casing having a wall extending lengthwise of the tube and against which the tube can be pressed for collapsing it, and a series of rollers in spaced relation to each other endwise unidirectionally of the tube, means to drive the rollers endwise of the wall, and said rollers being spaced from the wall so that each collapses the tube progressively at the portion between the periphery of the roller and the wall, and then to release it, as the roller progresses along the wall.

4. The apparatus according to claim 2 wherein the pump is driven by an electric motor, and intermitter means are provided for causing the pump motor to operate intermittently.

5. The apparatus according to claim 4 wherein drip feed means are provided for supplying additives to the tank in precise relation to the volumetric discharge of the pump.

6. The apparatus according to claim 5 wherein control means normally prevent the additives which drip from the feed means from flowing back to the tank, and means interconnect the intermitter means and control means to cause the control means to permit said flow of additives when the pump is operating.

7. An apparatus according to claim 1 wherein the bath is a dilute hygroscopic solution, and means are provided for controlling the power operated means so as to drive the filter belt along the upward portion of its path at a very slow rate for permitting any free solution to drain from the filter belt along the initial portion of said upward portion of the path and which permits substantial reduction of the water content of the films by the time they reach the downwardly traveling portion of the path, thereby to increase their viscosity.

8. The structure according to claim 1 wherein the outer face of the belt is unconfined while the belt is in contact with the lower roll.

9. The structure according to claim 1 wherein the apparatus is free from means for applying liquid to the belt while the belt is out of said bath.

10. An apparatus for the treatment of air and comprising an enclosure, upper and lower horizontal rolls therein, at least one of said rolls being a drive roll, means for driving the drive roll unidirectionally at very slow speed, an endless filter belt extending about the rolls and supported thereby and driven by the drive roll along a closed path wherein the inner face of the downwardly traveling portion of the belt is in spaced face to face relation to the inner face of the upwardly traveling portion of the belt, said enclosure having an inlet and an outlet, means to blow air into the inlet, means to direct the air blown into the inlet to enter the belt through one of said portions of the belt, then pass through both portions of the belt, and out through the other of said portions;

said filter belt being a compressible and distortable, resilient, self-restoring, three dimensional, open porous skeletal framework of interconnected strands of synthetic organic plastic material, and said frame work being of substantial thickness so that, upon buckling and flexure of the strands of the framework, the framework is reduced in thickness and the open pores are changed in shape and reduced in size and, upon discontinuance of the buckling and flexure, the framework is self-restored to its original thickness and the pores are self-restored to their original shape;

said open pores providing a multiplicity of relatively free interconnected passages extending through the filter belt and of a size affording a relatively free flow of air directly through the filter belt;

said lower roll being arranged to apply force downwardly against the inner face of the belt, at the lower portion of the belt, sufficient to buckle and flex the strands of the belt and thereby materially reduce gradually the thickness of the belt from the normal thickness it had as it approached the lower roll, and then to gradually release the force as the belt passes out from beneath the lower roll so that the belt restores itself to its normal thickness and the pores restore themselves to their original open shape; and means, including a tank, for maintaining a liquid bath through which the portion of the belt which is in contact with the lower roll is constrained to pass while said portion is in contact with said lower roll.

References Cited

UNITED STATES PATENTS

| | | | |
|---|---|---|---|
| 1,757,690 | 5/1930 | Strindberg | 55—492 |
| 1,888,001 | 11/1932 | Hicks | 261—80 |
| 1,949,540 | 3/1934 | Hammond | 261—80 |
| 1,970,301 | 8/1934 | Frankel | 261—80 |
| 1,976,401 | 10/1934 | Ilg | 55—353 |

(Other references on following page)

UNITED STATES PATENTS

| | | | |
|---|---|---|---|
| 2,105,887 | 1/1938 | Langford | 261—84 |
| 2,429,265 | 10/1947 | Fleisher | 261—24 |
| 2,516,680 | 7/1950 | Culpepper | 55—272 |
| 2,608,267 | 8/1952 | Ortiges | 55—229 |
| 2,703,228 | 3/1955 | Fleisher | 55—228 |
| 2,881,127 | 4/1959 | Hetzel | 210—401 |
| 2,957,491 | 10/1960 | Lowery | 210—198 |
| 2,966,960 | 1/1961 | Rochlin | 55—502 |
| 3,038,708 | 6/1962 | Rice | 261—80 |
| 3,053,392 | 9/1962 | Morrison | 210—401 |
| 3,075,333 | 1/1963 | Revell | 55—233 |
| 3,116,969 | 1/1964 | Coleman | 55—279 |
| 3,127,256 | 3/1964 | Boylan | 55—233 |

FOREIGN PATENTS

| | | |
|---|---|---|
| 63,354 | 2/1914 | Austria. |

HARRY B. THORNTON, *Primary Examiner.*

D. TALBERT, *Assistant Examiner.*

UNITED STATES PATENT OFFICE
CERTIFICATE OF CORRECTION

Patent No. 3,328,941　　　　　　　　　　　　July 4, 1967

Harold F. Green

It is hereby certified that error appears in the above numbered patent requiring correction and that the said Letters Patent should read as corrected below.

Column 1, line 34, for "a nair" read -- an air --; column 4, line 30, after "matter" insert -- carried --; column 5, line 75, for "in" read -- is --; column 6, line 15, for "prevening" read -- preventing --; column 7, line 25, for "bah" read -- bath --; column 8, line 55, for "futher" read -- further --; line 62, for "evoparated" read -- evaporated -- column 9, line 55, for "through" read -- though --.

Signed and sealed this 15th day of October 1968.

(SEAL)
Attest:

Edward M. Fletcher, Jr.
Attesting Officer

EDWARD J. BRENNE
Commissioner of Patents